US008179551B2

(12) United States Patent
Yamamichi

(10) Patent No.: US 8,179,551 B2
(45) Date of Patent: May 15, 2012

(54) PRINT CONTROL APPARATUS, PRINT CONTROLLING METHOD AND MEDIUM

(75) Inventor: Masaki Yamamichi, Yokohama (JP)

(73) Assignee: Canon Kabushiki Kaisha (JP)

( * ) Notice: Subject to any disclaimer, the term of this patent is extended or adjusted under 35 U.S.C. 154(b) by 826 days.

(21) Appl. No.: 12/263,464

(22) Filed: Nov. 1, 2008

(65) Prior Publication Data

US 2009/0116060 A1 May 7, 2009

(30) Foreign Application Priority Data

Nov. 1, 2007 (JP) .................................. 2007-285404

(51) Int. Cl.
G06F 3/12 (2006.01)

(52) U.S. Cl. ....... 358/1.15; 358/1.9; 358/1.14; 358/442; 399/83; 399/81; 379/100.17; 379/93.32; 709/228

(58) Field of Classification Search ................. 358/1.15, 358/1.14, 1.13, 462, 3.28, 1.9, 1.16; 399/83, 399/75, 81, 388; 709/228, 218; 379/93.32, 379/93.31, 100.17
See application file for complete search history.

(56) References Cited

U.S. PATENT DOCUMENTS

| 5,293,466 | A  | * | 3/1994  | Bringmann     | 358/1.15 |
|-----------|----|---|---------|---------------|----------|
| 6,515,756 | B1 | * | 2/2003  | Mastie et al. | 358/1.15 |
| 7,042,585 | B1 | * | 5/2006  | Whitmarsh et al. | 358/1.15 |
| 7,161,693 | B2 | * | 1/2007  | Kizaki et al. | 358/1.13 |
| 7,605,936 | B2 | * | 10/2009 | Uchida et al. | 358/1.15 |
| 7,612,921 | B2 | * | 11/2009 | Okabe et al.  | 358/403  |
| 7,649,640 | B2 | * | 1/2010  | Young et al.  | 358/1.13 |
| 7,651,081 | B2 | * | 1/2010  | Yokobori et al. | 270/58.23 |
| 7,667,874 | B2 | * | 2/2010  | MacDonald et al. | 358/2.1 |
| 7,715,030 | B2 | * | 5/2010  | Higashiura et al. | 358/1.14 |
| 7,760,378 | B2 | * | 7/2010  | Maruyama      | 358/1.15 |
| 7,924,444 | B2 | * | 4/2011  | Takahashi     | 358/1.13 |
| 8,011,406 | B2 | * | 9/2011  | Niwa et al.   | 156/378  |
| 8,064,734 | B2 | * | 11/2011 | Izawa et al.  | 382/300  |
| 2004/0028442 | A1 | * | 2/2004 | Noguchi et al. | 400/76 |
| 2007/0070466 | A1 | * | 3/2007 | Okuyama      | 358/518 |
| 2007/0226808 | A1 | * | 9/2007 | Uchikawa     | 726/27 |
| 2007/0268518 | A1 | * | 11/2007 | Yokoyama    | 358/1.15 |
| 2007/0273913 | A1 | * | 11/2007 | Nakata       | 358/1.14 |
| 2007/0273915 | A1 | * | 11/2007 | Nakagawa     | 358/1.14 |
| 2007/0283155 | A1 | * | 12/2007 | Kato         | 713/171 |
| 2007/0285687 | A1 | * | 12/2007 | Okuyama      | 358/1.9 |
| 2008/0007760 | A1 | * | 1/2008 | Kimura        | 358/1.14 |
| 2008/0049246 | A1 | * | 2/2008 | Kim           | 358/1.15 |

FOREIGN PATENT DOCUMENTS

JP 2005-169672 A 6/2005

* cited by examiner

*Primary Examiner* — Negussie Worku

(74) *Attorney, Agent, or Firm* — Rossi, Kimms & McDowell LLP

(57) ABSTRACT

A print control apparatus comprising a storage unit configured to store restriction information which restricts print functions, a determination unit configured to refer to the data storage location specified by the restriction information, compare the attributes of the electronic data stored in the data storage location and the attributes of the print data, and determine whether or not a condition specified in the restriction information is met, and a control unit configured to restrict printing of the print data when it is determined that the condition is met, and configured not to restrict printing of the print data when it is determined that the condition is not met.

8 Claims, 18 Drawing Sheets

FIG. 13

| | | |
|---|---|---|
| 1301 — NUMBER OF COPIES | 10 | |
| 1302 — PAGES | 1 | 10 |
| 1303 — PAPER SIZE | A4 ▽ | |
| 1304 — PRINT METHOD | BOTH SIDES ▽ | |
| | 1305 — ☑ PUNCH HOLES | |

OK     CANCEL 1306     1307

F I G. 15

| HOT FOLDER NAME | PRINTER NAME | STATUS | FOLDER PATH | JOB TICKET |
|---|---|---|---|---|
| HOT001 | PRINTER A | NORMAL | C:\HOT001 | JOB TICKET 1 |
| HOT002 | PRINTER A | UNABLE TO PRINT | C:\HOT002 | JOB TICKET 2 |
| HOT003 | PRINTER A | ACCESS DENIED | C:\HOT003 | JOB TICKET 3 |
| HOT004 | PRINTER X | PRINTER UNKNOWN | C:\HOT004 | JOB TICKET 4 |
| HOT005 | PRINTER X | JOB TICKET UNKNOWN | C:\HOT005 | JOB TICKET 5 |
| HOT006 | PRINTER B | PRINTING | C:\HOT006 | JOB TICKET 6 |
| HOT007 | PRINTER A | FOLDER UNKNOWN | C:\HOT007 | JOB TICKET 7 |

| PROPERTY | CONTENT |
|---|---|
| category | CATEGORY OF CONTENT |
| contentStatus | STATUS OF CONTENT |
| contentType | TYPE OF CONTENT |
| created | DATE AND TIME OF COMPOSITION |
| description | TYPE OF TEXT AND GRAPHICS ETC. |
| identifier | IDENTIFIERE |
| keywords | KEYWORD |
| language | DESCRIPTION LANGUAGE |
| lastModifiedBy | PERSON WHO MADE THE LAST MODIFICATION |
| lastPrinted | DATE AND TIME OF THE LAST PRINT EVENT |
| modified | DATE AND TIME OF THE LAST MODIFICATION |
| revision | REVISION |
| subject | SUBJECT FOR THE CONTENT |
| title | TITLE OF THE PACKAGE |
| version | VERSION |

PRINT CONTROL APPARATUS, PRINT CONTROLLING METHOD AND MEDIUM

BACKGROUND OF THE INVENTION

1. Field of the Invention

The present invention relates to a print control apparatus which controls print functions.

2. Description of the Related Art

Conventionally, when printing is to be executed, print processing devices such as printer drivers obtain data for printing created by an Operating System (OS hereinafter) such as Windows™. Further, a print processing device converts data for printing to a print data format which can be understood by a printer such as PDL or an image, and subsequently transmits and outputs the data. Afterwards, rendering data included in the data for printing is analyzed and the printing operation is modified in accordance with the analysis results. Such a process flow is widely used.

In recent years, leakage of confidential information, such as the list of clients of a corporation, has frequently occurred. When such incidents occur, corporations victimized by such espionage often lose trust, and may end up having to make huge expenditures to cope with the damage and compensation payments. Further, because of the increase in the number of incidents of information leakage, a measure to better cope with information leakage is in demand. Such demand has arisen due to progress in digitalization and mobilization of information and their availability through networks, which enable easy access to a large amount of information and drastically improve ubiquity of information.

As a measure to prevent such leakage of information, a method has been conventionally used which sets access rights to confidential information or storage devices storing such confidential information and restricts users having access to the confidential information. However, when leakage of information is committed by a user who was authorized to access confidential information, this method of information leakage prevention is not adequate.

Further, information to be protected from leakage includes not only those of large corporations that are enormous in volume, but also critical information that may be small in volume. Such information can easily be taken out in printed form, which necessitates security measures to prevent information leakage for printed materials.

In Japanese Patent Laid Open 2005-169672, a print processing device is disclosed which analyzes images or text in the received rendering data, and aborting printing when a predetermined keyword is detected which indicates that the rendering data is not to be printed out.

Conventionally, however, such operation is performed solely by the rendering data included in the data for printing to be used in the printing process, and cannot be performed according to the original file from which the data for printing is generated and used by the application. Accordingly, it is not possible to control printing operations, such as forcibly aborting printing, according to the status of the original file, its storage location, etc.

SUMMARY OF THE INVENTION

The present invention provides a print control apparatus which is capable of controlling print functions based on the status of the original file.

The present invention in its first aspect provides a print control apparatus which executes print control utilizing print data used in printing generated from electronic data having attributes, comprising: a storage unit configured to store restriction information which restricts print functions; a determination unit configured to refer to the data storage location specified by the restriction information, compare the attributes of the electronic data stored in the data storage location and the attributes of the print data, and determine whether or not a condition specified in the restriction information is met, and; a control unit configured to restrict printing of the print data when it is determined by the determination unit that the condition is met, and configured not to restrict printing of the print data when it is determined by the determination unit that the condition is not met.

The present invention in its second aspect provides a print control method which executes print control utilizing print data used in printing generated from electronic data having attributes, comprising the steps of: storing restriction information which restricts print functions; referring to the data storage location specified by the restriction information, comparing the attributes of the electronic data stored in the data storage location and the attributes of the print data, and determining whether or not a condition specified in the restriction information is met, and; restricting printing of the print data when it is determined that the condition is met, and not restricting printing of the print data when it is determined that the condition is not met. The present invention in its third aspect provides a computer readable storage medium which stores a print control program that executes print control utilizing print data used in printing generated from electronic data having attributes, wherein the program causes a computer to: store restriction information which restricts print functions; refer to the data storage location specified by the restriction information, compare the attributes of the electronic data stored in the data storage location and the attributes of the print data, and determine whether or not a condition specified in the restriction information is met, and; restrict printing of the print data when it is determined that the condition is met, and not restrict printing of the print data when it is determined that the condition is not met.

According to the present invention, a print control apparatus can control print functions based on the original file, thus improving security.

Further features of the present invention will become apparent from the following description of exemplary embodiments with reference to the attached drawings.

BRIEF DESCRIPTION OF THE DRAWINGS

FIG. 13 is a diagram showing an exemplary window to modify output attributes.

FIG. 15 is a diagram showing an exemplary hot folder management table according to the present embodiment.

FIG. 18 is a diagram showing an example of the core property.

DESCRIPTION OF THE EMBODIMENTS

Figure 1:
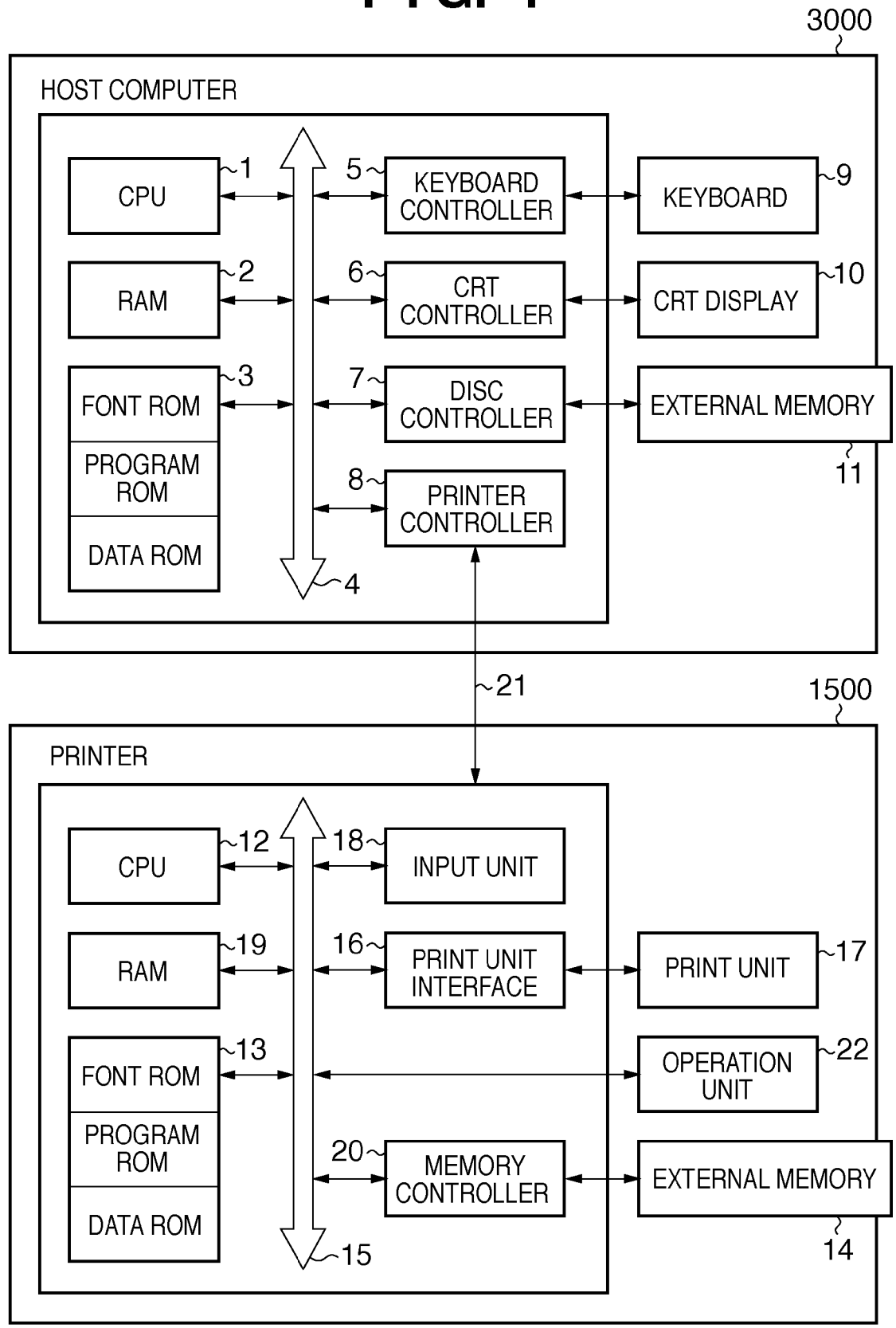
FIG. 1 is a block diagram showing the structure of the print system according to a first embodiment of the present invention.

The best mode for carrying out the present invention will now be described with reference to the accompanying drawings. The same reference numerals denote the same constituent elements, and a description thereof will be omitted.

FIG. 1 is a block diagram showing the structure of the print system according to a first embodiment of the present invention. In the present embodiment, the system illustrated in FIG. 1 can be a system comprising a single device or a plurality of devices. Further, it also can be a system in which processing is performed via connection to a network such as LAN or WAN. As shown in FIG. 1, a host computer 3000 includes a CPU 1. The CPU 1 controls performing print processing on document processing and resulting print processing, based on a document processing program, etc., stored in a program ROM 3 or an external memory 11. Document processing mentioned here indicates processing of documents in which figures, images, texts, and charts (including table calculation) are mixed, which includes processing in each embodiment. The CPU 1 controls each of the devices connected to a system BUS 4. Further, an operating system program (OS), which is the control program of the CPU 1 and the likes, are stored in either the program ROM included in the ROM 3 or the external memory 11. Further, in the Font ROM of ROM 3 or the external memory 11, font data and the likes, which are used in document processing, are stored. Further, in the Data ROM of ROM 3 or the external memory 11, various data and the likes, which are used in document processing, are stored. A RAM 2 serves functions such as the main memory of the CPU 1 and its work area. A keyboard controller 5 controls key inputs from a keyboard 9 and a pointing device not illustrated in FIG. 1. A CRT controller 6 controls display by a CRT display 10, including display of a tint block image. A display controller 7 controls access with the external memory 11. In such a case, a hard disc or a floppy disc that can store a boot program, various kinds of applications, font data, user files, edit files, printer control command generating programs, etc., is used as the external memory 11. A printer controller 8 is connected to a printer 1500 via a bi-directional interface 21 and executes communication control processing with the printer 1500.

Note that the CPU 1 opens various types of windows that are registered ahead of time and executes various types of data processing, based on commands instructed using a mouse cursor or the like on the CRT display 10, which is not illustrated. The user can configure setting of the print processing method such as setting of the printer and selection of print mode, by opening a window regarding print setting.

A printer 1500 is controlled by a CPU 12. The CPU 12 outputs a image signal which is print output information to a print unit 17 connected to a system BUS 15, via a print unit interface 16, based on control programs and such stored in a ROM 13 or an external memory 14. From hereon, the print unit 17 will be called as a printer engine. Further, the program ROM of the ROM 13 stores programs such as the control program of the CPU 12. Also, the font ROM of the ROM 13 stores data such as font data used when generating print output information. Further, when the printer is without an external memory 14 such as a hard disc, the data ROM of the ROM 13 stores information to be used in the computer. The CPU 12 can perform communication processing with the host computer 3000 via an input unit 18, and information within the printer 1500 and the like is notified to the host computer 3000. A RAM 19 serves functions such as the main memory of the CPU 12 and its work area. Further, it is possible to expand memory capacity using optional RAM connected to the expansion port which are not illustrated in the figure. Note that the RAM 19 can be used for purposes such as an output information deploying domain, an environment data storage domain and an NVRAM. Access by the external memory 14 such as a hard disc or an IC card, is controlled by a memory controller 20. The external memory 14 is optionally connected, and stores data such as font data, emulation program, and form data. Further, an operation unit 22 is, for example, an operational panel, and includes switches for a user operation, a LED indicator, etc. Further, in the present embodiment, it is also possible for the printer 1500 to include an NVRAM, which is not illustrated in the figure, and store the print mode setting information inputted from the operation unit 22. In the present embodiment, the print unit 17 is an electronic photograph printer engine, but print formats other than the electronic photograph format can also be utilized.

Figure 2:
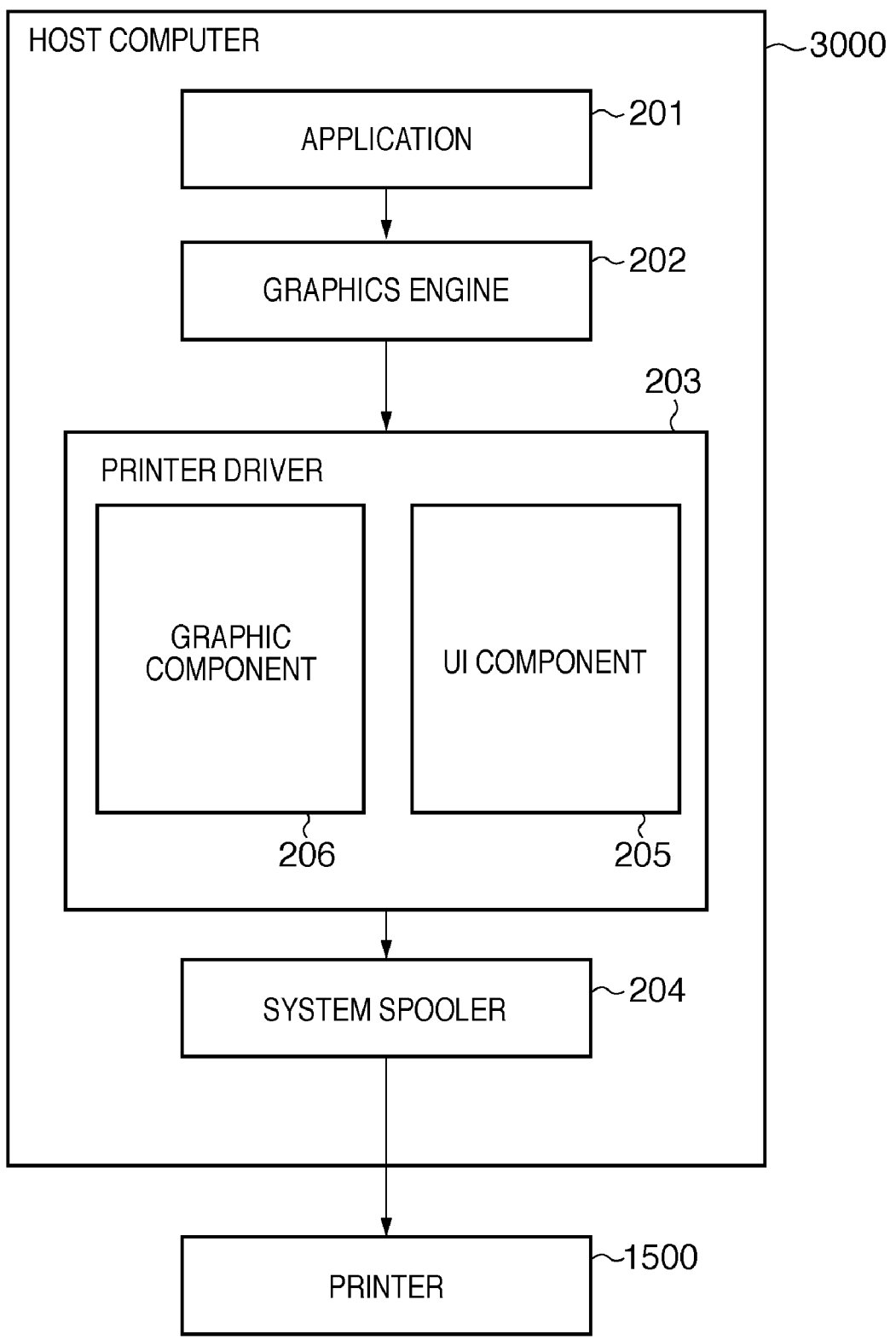
FIG. 2 is a diagram showing an exemplary structure of a host computer shown in FIG. 1.

FIG. 2 is a diagram showing an exemplary structure of a host computer 3000 shown in FIG. 1. As shown in FIG. 2, the host computer 3000 includes an application 201, a graphics engine 202, a printer driver 203, and a system spooler 204. These are program modules stored as files in the external memory 11, and are loaded to the RAM 2 and executed by other modules utilizing the OS or program modules. Further, the application 201 and the printer driver 203 are capable of adding the program modules using a CD-ROM or a network, not illustrated in the figure, to the external memory 11 such as a hard disc. The application 201 stored in the external memory 11 is loaded to the RAM 2 and executed. Accordingly, when printing is performed from the application 201 to the printer 1500, output (drawing) is performed utilizing the graphic engine 202 which is loaded to the RAM 2 in an operable state. The graphic engine 202 loads, from the external memory 11 to the RAM 2, the printer driver 203 provided for each of the printing devices such as a printer, and sets the output of the application 201 at the printer driver 203. Further, the graphic engine 202 receives data for either print setting or printing from the application 201, and outputs to the printer driver 203. A UI component 205 included in the printer driver 203 receives print setting from the graphic engine 202, either displays or modifies the print setting, and replies to the application 201 via the graphic engine 202. A graphic component 206 included in the printer driver 203 receives data for printing from the graphic engine 202 and converts it to a control command which can be recognized by printers such as Page-Description Language (PDL). The converted print control command is outputted to the printer 1500 via the system spooler 204 loaded to the RAM 2 by the OS and through the bi-directional interface 21.

Figure 3A:
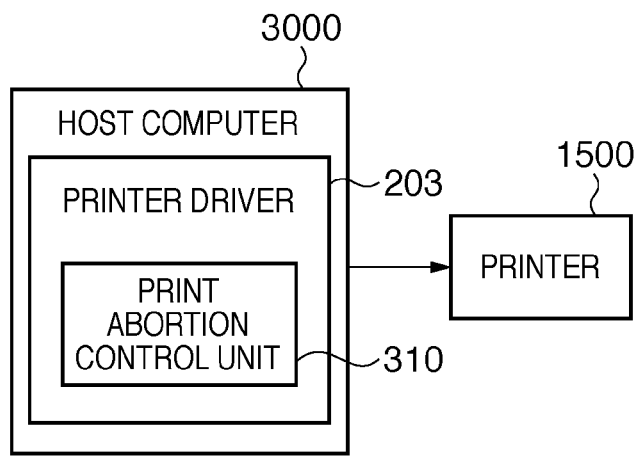
FIG. 3A is a diagram showing the operational structure of the present embodiment.
Figure 3B:
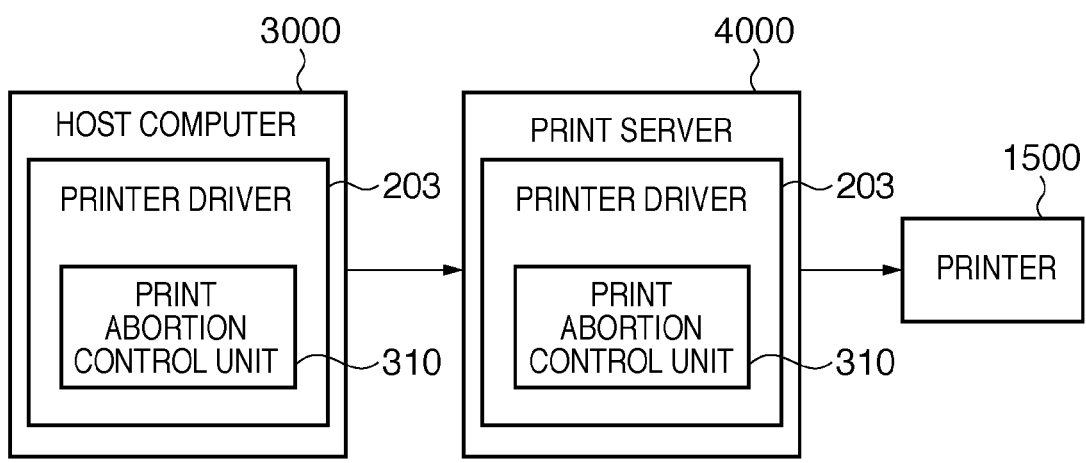
FIG. 3B is a diagram showing a different operational structure of the present invention.

FIGS. 3A and 3B are diagrams showing the operational structures of the present embodiment. FIG. 3A shows the simplest structural example for the present embodiment. A print abortion control unit 310 is structured within the host computer 3000, and whether printing is to be commenced or aborted is determined at the print abortion control unit 310.

According to the determination result, the print data is either directly transmitted to the printer 1500, or is destroyed. In the present structure, the print abortion information, which will be discussed later, is set up before installing the printer driver 203. FIG. 3A illustrates the minimal and standard structure for the present embodiment. Unless stated otherwise, the explanation given below will discuss implementation of the present structure. On the other hand, FIG. 3B shows a diagram in which a print server 4000 is structured between the host computer 3000 and the printer 1500. According to the setting of the printer cue for the host computer 3000 and the print server 4000, either one of the host computer 3000 or the print server 4000 is determined to generate the data for printing. In a case where the data for printing is to be generated at the host computer 3000, it is determined whether or not printing is to be performed at the print abortion control unit 310 structured within the printer driver 203 of the host computer 3000. According to this determination result, the data for printing is forwarded from the printer driver 203 to the printer 1500 via the corresponding printer cue (print spooler) in the print server 4000. On the other hand, in a case where the data for printing is to be generated at the print server 4000, it is determined whether or not printing is to be performed at the print abortion control unit 310 structured at the printer driver 203 of the printer cue (print spooler) corresponding to the print server 4000. According to this determination result, the data for printing is forwarded to the printer 1500. With such structuring, it is possible to deal with a structure that utilizes the print server 4000. Further, structuring the printer driver 203 within the print server 4000 enables printer driver distribution and synchronization to the host computer 3000, sharing of setup information, etc. Further, various settings pertaining to print abortion function can be managed as a bundle in the print server 4000, disabling users without authorization from performing various settings of the print abortion function.

Figure 4:
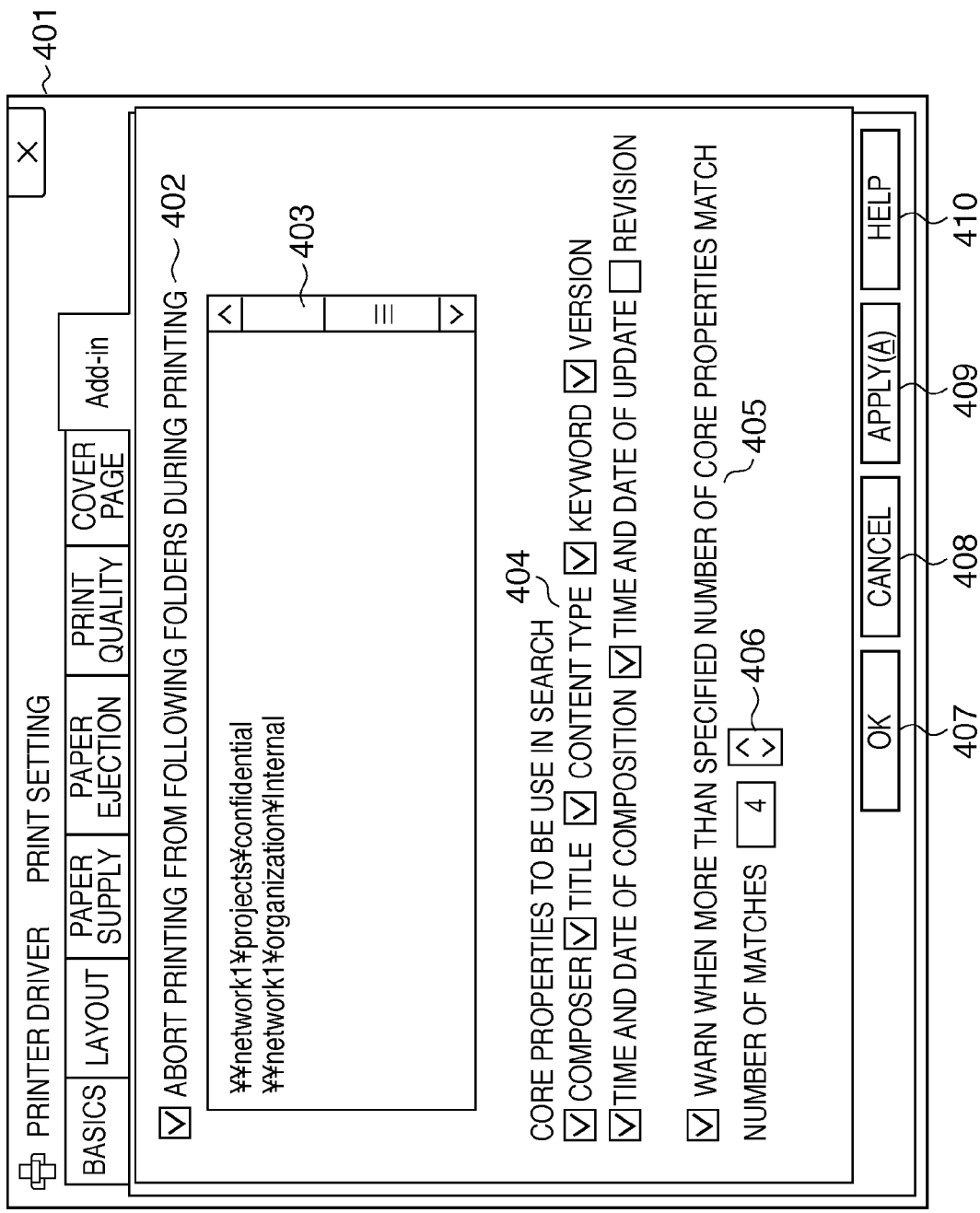
FIG. 4 is a diagram showing an exemplary window for configuring print abortion information in a printer driver within a print server.

FIG. 4 is a diagram showing an exemplary window for setting the print abortion information at the printer driver within the print server 4000 in the structure shown in FIG. 3B. In the present embodiment, print abortion information indicates information for controlling print functions, which is alternatively called restriction information. A window 401 is the main window of the printer driver user interface. A display area 402 indicates whether or not printing is to be aborted from a specified folder during printing. A display area 403 displays a folder path (data storage location) that aborts printing, and is capable of modifying the folder path. A display area 404 is utilized for core property comparison during searching of the original file, and it is possible to select properties to be used in the comparison. A display area 405 indicates whether or not a warning should be made when more than the specified number of properties of the core property match. A display area 406 indicates conditions of the number of matching properties when a warning window is displayed. When a button 407 is pressed, the current setting is applied, and the window 401 closes. Further, when a button 408 is pressed, the window 401 closes without applying the current setting. Further, when a button 409 is pressed, the current setting is applied. When a button 410 is pressed, help function for the printer driver 203 is displayed.

Figure 5:
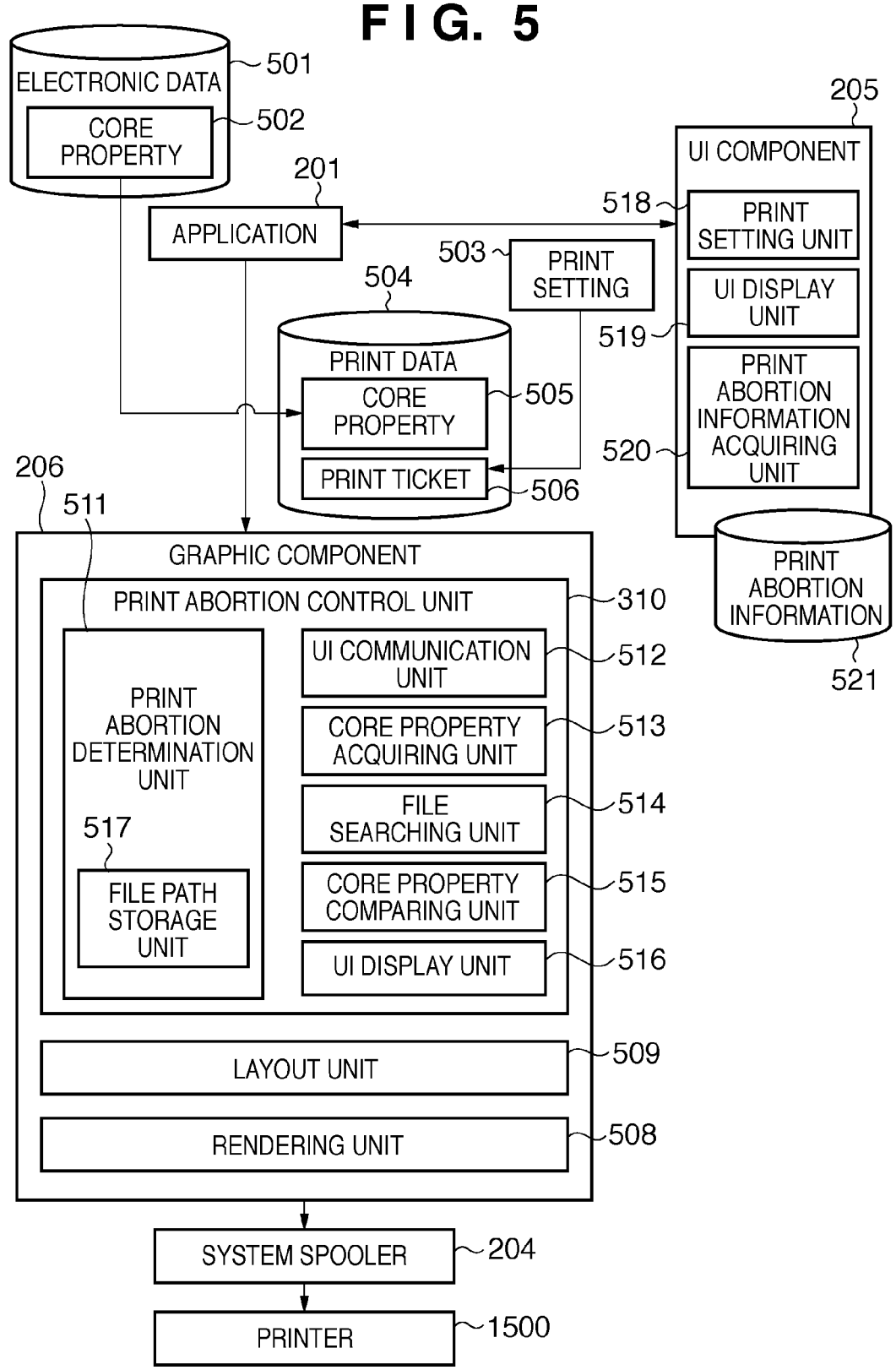
FIG. 5 is a diagram showing the structure of the system for print configuration and print execution.

Below, with reference to FIGS. 5 to 9, the order of print control processing of the present invention will be explained. FIG. 5 is a diagram showing the structure of the system for print configuration and print execution. The structure, data flow of the system pertaining to the print setting and print execution according to the present embodiment will be explained with reference to FIG. 5.

Electronic data 501 is a file based on Open Package Convention (OPC) which is kept by the application 201 for editing, and keeps a core property 502 as a part of the file.

Figure 17:
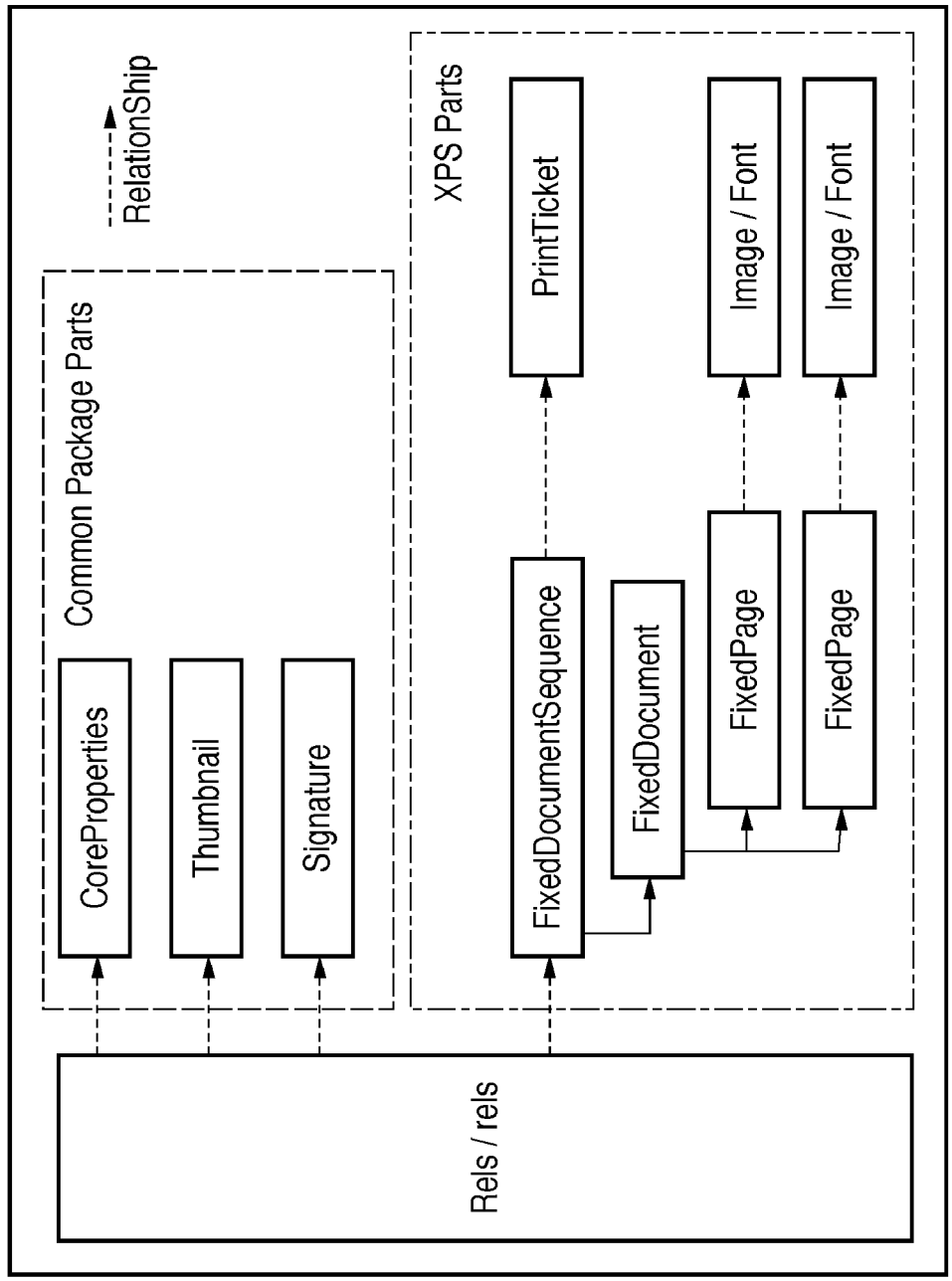
FIG. 17 is a diagram showing the logic structure of the XPS.

Here, the generally known OPC will be explained with reference to FIGS. 17 and 18. The OPC provides the base of the format for package files which keeps package attributes in a print system which executes printing from an application or a service, etc. As an example of a package model which is based on the OPC, XML Paper Specification (XPS) is known. FIG. 17 is a diagram showing the logic structure of the XPS. The XPS, which also is an example of a package model based on the OPC, provides a logic structure by concepts called "Parts" and "RelationShip". Generally, "Parts" mean data stream, which is defined in either XMN or binary format. Further, "Relationship" indicates a relationship of "Parts" and "Parts", which is described in XML. Further, in regard to XPS, physical structure is provided by a standard ZIP archive. XPS is a document format which is written in XML. For example, in Windows™ Vista, the XPS document format is implemented, and is used as the document format for printers, the spool file format of Windows™, or the page description language. Further, during printing, XPL printing paths are employed. XPS is comprised of an XPS package main body indicated by "Rels/.rels", common format parts indicated as "CommonPackageParts", unique parts indicated as "XPS parts", and "RelationShip". Further, as shown in FIG. 17, the "CommonPackageParts" includes "Core Property" which keeps attributes of the package, "Thumbnail" which indicates the thumbnail of the entire package, and "Signature" which indicates parts for signature. Further, in "XPS parts", "FixedDocumentSequence" is the uppermost layer of XPS documents, and describes the order of "FixedDocument" which sits below. Further, "FixedDocument" indicates document which describes the order of "FixedDocument" which sits below. "FixedPage" used herein indicates parts which expresses pages. Further, "PrintTicket" keeps print settings during printing. Further, "Image/Font" is a resource which is referred to from each of the pages, etc. Further, in OPC, it is possible to keep properties which indicate the package itself or the content of the package (creator, title, identifier, etc.), illustrated as core properties in FIG. 18. We now return to FIG. 5. Print setting 503 is data set by the application, which is handed over to a print setting unit 518 of the UI component 205. Subsequently, at the print setting unit 518, Japanese hyphenation is performed on the received print setting 503, and is handed to and displayed by the UI display unit 519. Afterwards, according to need, the user performs modification of print setting using a printer driver user interface (not illustrated) and returns the processed print setting 503 to the application 201. A print abortion information acquiring unit 520 acquires print abortion information 521. The print abortion information 521 keeps information relating to print aborting function as, for example, registry or file data.

The application 201 creates print data 504 (XPS:XML Paper Specification) via the OS based on the electronic data 501 and the print setting 503 at the time of print execution. The core property 505 mentioned here becomes the same in value to the core property 502, and the print ticket 506 becomes the same in value to the print setting 503.

The print abortion control unit 310 controls print execution or abortion during printing. A print abortion determination unit 511 determines whether printing is to be executed or aborted. A UI communication unit 512 acquires print abortion information 521 by executing transmission with the UI component 205. A core property acquiring unit 513 acquires the core property 505 within the print data 504. A file searching unit 514 obtains the core properties of the file group in the print aborted folder specified in a print abortion folder path information (area 902) of the print abortion information 521. A core property comparing unit 515 compares the core properties of the obtained file group and the core properties 505. A UI display unit 516 displays windows such as a window 801 shown in FIG. 8A or a window 803 shown in FIG. 8B, according to the comparison result at the core property comparing unit 515. A file path storage unit 517 stores the file path information that matched at the core property comparing unit 515. The layout unit 509 processes the print data 504 when executing printing, and provides a layout. A rendering unit 508 converts the print data 504 to a control command which can be recognized by a printer such as PDL. Afterwards, via the system spooler 204, the data is output at the printer 1500.

Figure 6:
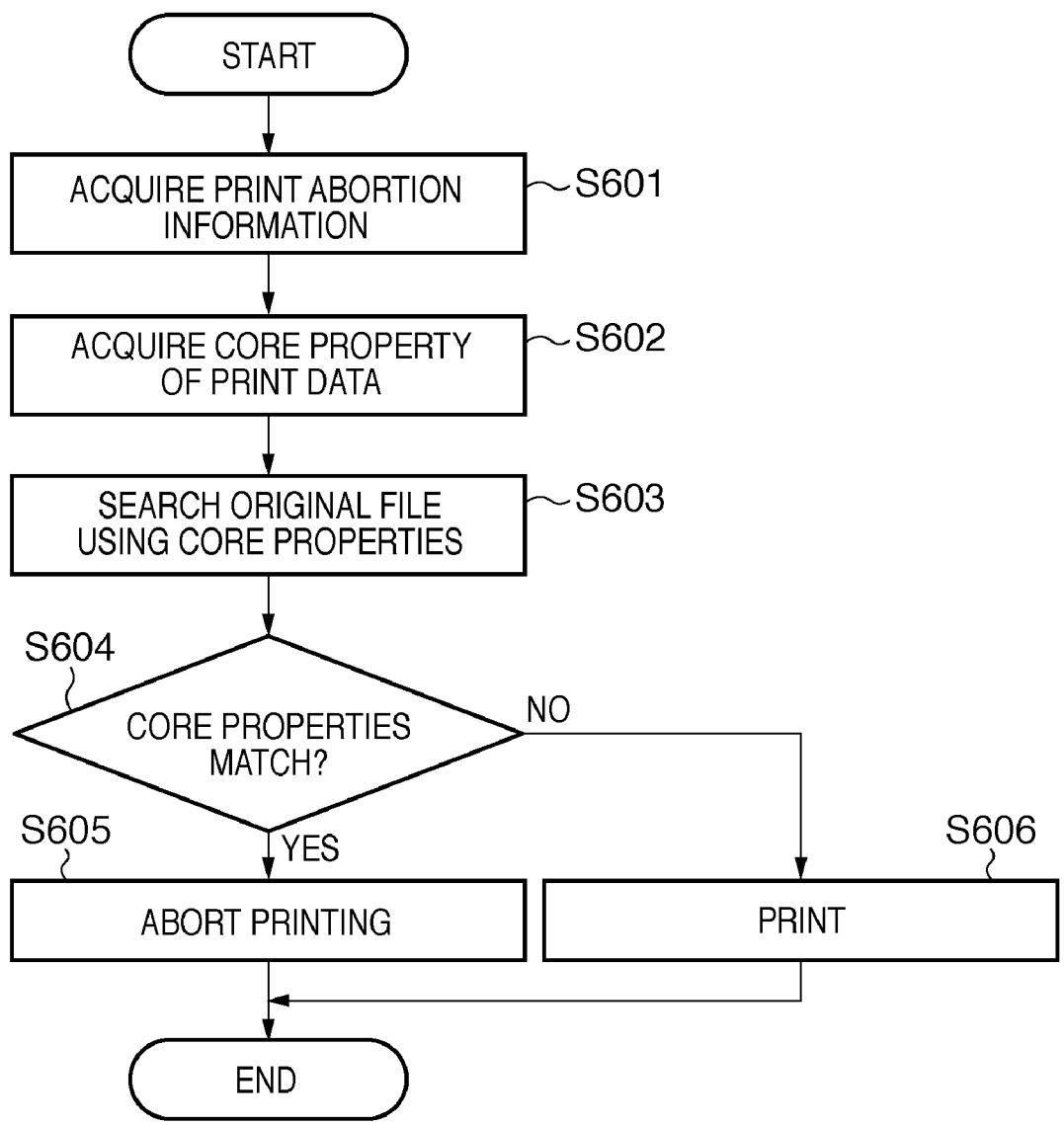
FIG. 6 is a flow chart showing the order of print controlling processes according to the present invention.

FIG. 6 is a flow chart showing the order of print controlling processes according to the present invention. First, at step S601, the UI communication unit 512 obtains the print abortion information 521 by communicating with the UI component 205.

At step S602, the core property acquiring unit 513 acquires the core properties 505 from the print data 504 received by the graphic component 206.

At step S603, the file searching unit 514 obtains the core properties of the file group within the print aborted folder specified by the print aborted folder path information (area 902) of the print abortion information 521 obtained at step S601.

At step S604, the core property comparing unit 515 compares the core properties of the file obtained at step S603 and the core properties 505 obtained at step S602. At this step, if the conditions specified by the restriction information are met, i.e., if the core properties match, the process moves on to step S605. If they do not match, on the other hand, the process moves to step S606.

At step S605, the print abortion determination unit 511 immediately arrests printing. At step S605, the print abortion determination unit 511 can also be arranged to modify the print abortion and print execution determination, depending on the access authorization of the user who performed print execution to the concerned folder. At step S606, the print abortion determination unit 511 continues printing.

Figure 7:
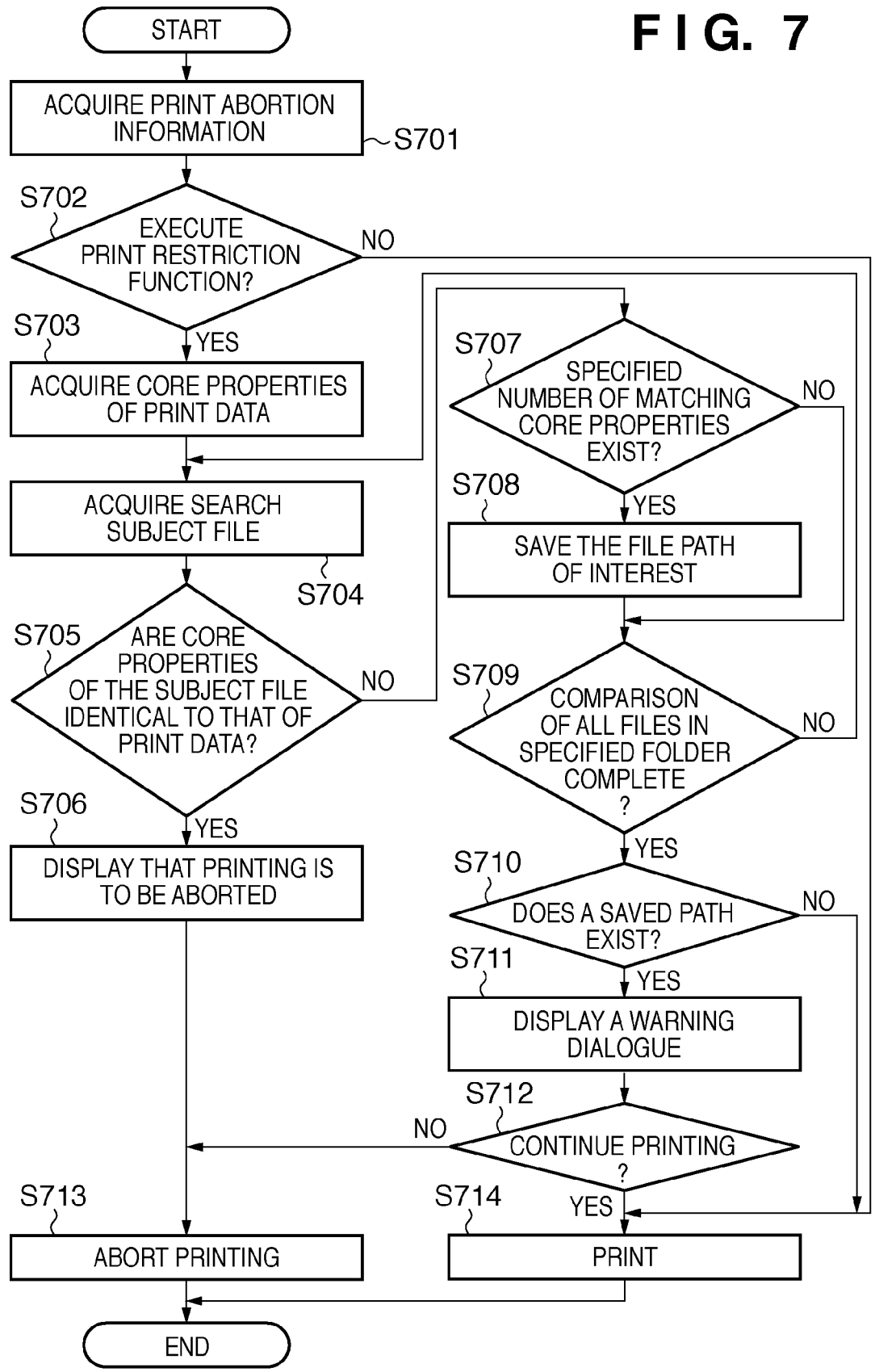
FIG. 7 is a diagram showing the details of the flow chart shown in FIG. 6.

FIG. 7 is a diagram showing the details of the flow chart shown in FIG. 6. At step S701, the UI communication unit 512 acquires the print abortion information 521 by communicating with the UI component 205.

Next, at step S702, the print abortion control unit 310 acquires whether or not to execute print control function (area 901) and determines whether or not to execute print restriction. When it is determined not to execute print restriction function, the process moves on to step S714, and at this step the graphic component 206 executes processing of printing, and terminates the present flow chart. On the other hand, when it is decided to execute print restriction function, the process moves on to step S703.

At step S703, the core property acquiring unit 513 acquires core properties 505 from the print data 504 received by the graphic component 206.

At step S704, the file searching unit 514 acquires print abortion folder path information (area 902) from the print abortion information obtained at step S701. This can also be arranged to immediately abort print processing in cases such as when the concerned folder cannot be reached.

At step S705, the core property comparing unit 515 compares the core properties of the file obtained at step S704 and the core properties 505 obtained at step S703. The core properties used in the comparison are obtained from the core property comparison subject information (area 903). When all properties are found to match from the comparison result, the process moves to step S706. On the other hand, when no matches were found, the process moves to step S707.

Figure 8A:
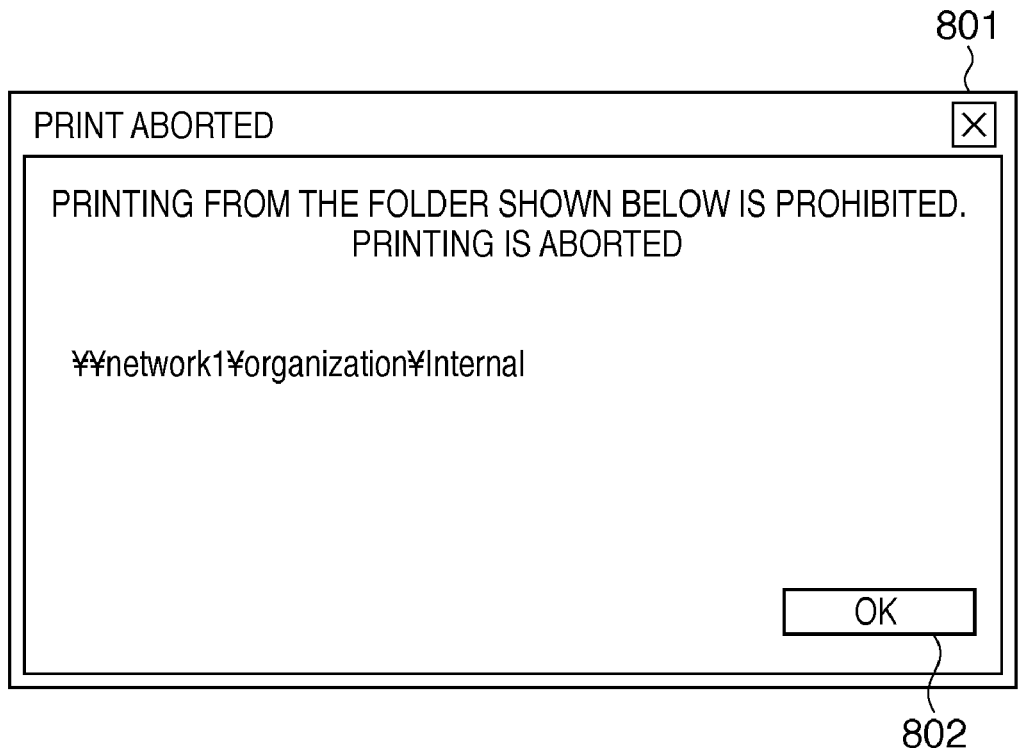
FIG. 8A is a diagram showing an exemplary window displayed on a UI display unit.

At step S706, the UI display unit 516 can display a user interface such as the window 801 shown in FIG. 8A. By pressing the button 802 at this point, the processing continues. At step S713, the graphic component 206 aborts print processing and terminates the present flow chart.

At step S707, print abortion condition information (area 904) is obtained, and it is determined whether or not a specified number of matching core properties exist. When it is determined that more than the specified number of matching properties exist, the process moves on to step S708, and the file path storage unit 517 stores the corresponding file paths. It can also be arranged at this point to move onto step S713 and immediately abort printing when it is determined that more than the specified number of matching core properties exist. On the other hand, when it is determined that the number of matching core properties is less than the specified number, the process moves on to step S709.

At step S709, the print abortion control unit 310 determines whether the comparison of core properties of all files in the print aborted folder with the core properties 505 has ended or not. When it is determined to have ended, the process moves on to step S710. On the other hand, when it is determined not to have ended, the process moves on to step S704.

At step S710, it is determined whether or not file paths stored in the file path storage unit 517 exist. When it is determined at this step that such file paths exist, the process moves onto step S711. On the other hand, when it is determined that they do not exist, the process moves to step S714.

Figure 8B:
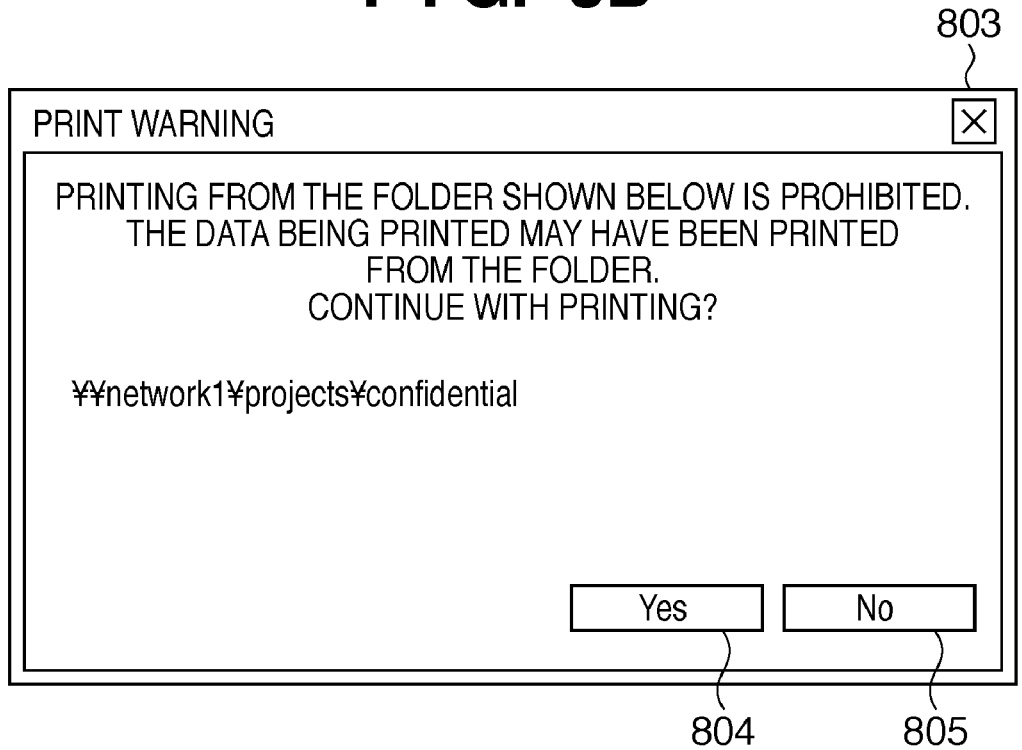
FIG. 8B is a diagram showing a different screen displayed on the UI display unit.

At step S711, the UI display unit 516 displays a user interface such as the window 803 shown in FIG. 8B.

At step S712, when a button 804 is pressed, the print abortion determination unit 511 determines that the printing is to be continued and moves onto step S714, and when a button 805 is pressed, the process moves on to S713. At step S714, the graphic component 206 continues print processing, and according to the print ticket 506 provides a layout at the layout unit 509, and converts, at the rendering unit 508, the command to a control command such as PDL which can be recognized by printers. Then, the control command is output to the printer 1500 via the system spooler 204.

Figure 9:
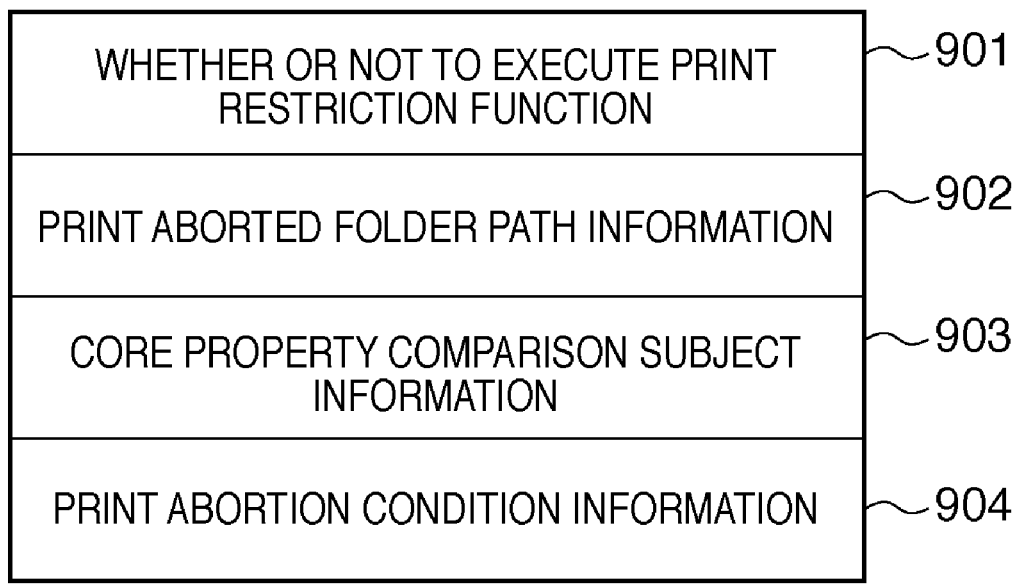
FIG. 9 is a diagram showing an example of information regarding print controlling function obtained by a UI component of the printer driver according to the present embodiment.

FIG. 9 is a diagram showing an example of information regarding print controlling function obtained by a UI component 205 of the printer driver 203 according to the present embodiment. The area 901 stores information indicating whether print restriction function is to be applied or not during print execution. The area 902 stores folder paths which arrests printing with the print restriction function. It is possible at this point to specify a specific folder as a method of specifying folder paths, and it is also possible to specify a particular folder which includes a sub folder. The area 903 stores property information utilized as comparison subject of core properties. The area 904 stores conditional information of print abortion regarding matching core properties.

As discussed above, according to the present embodiment, original files are acquired by comparing core properties at the time of print execution, and printing is either aborted or continued. It is also possible for the present embodiment to perform a different operation instead of print abortion after acquiring the original file.

Figure 10:
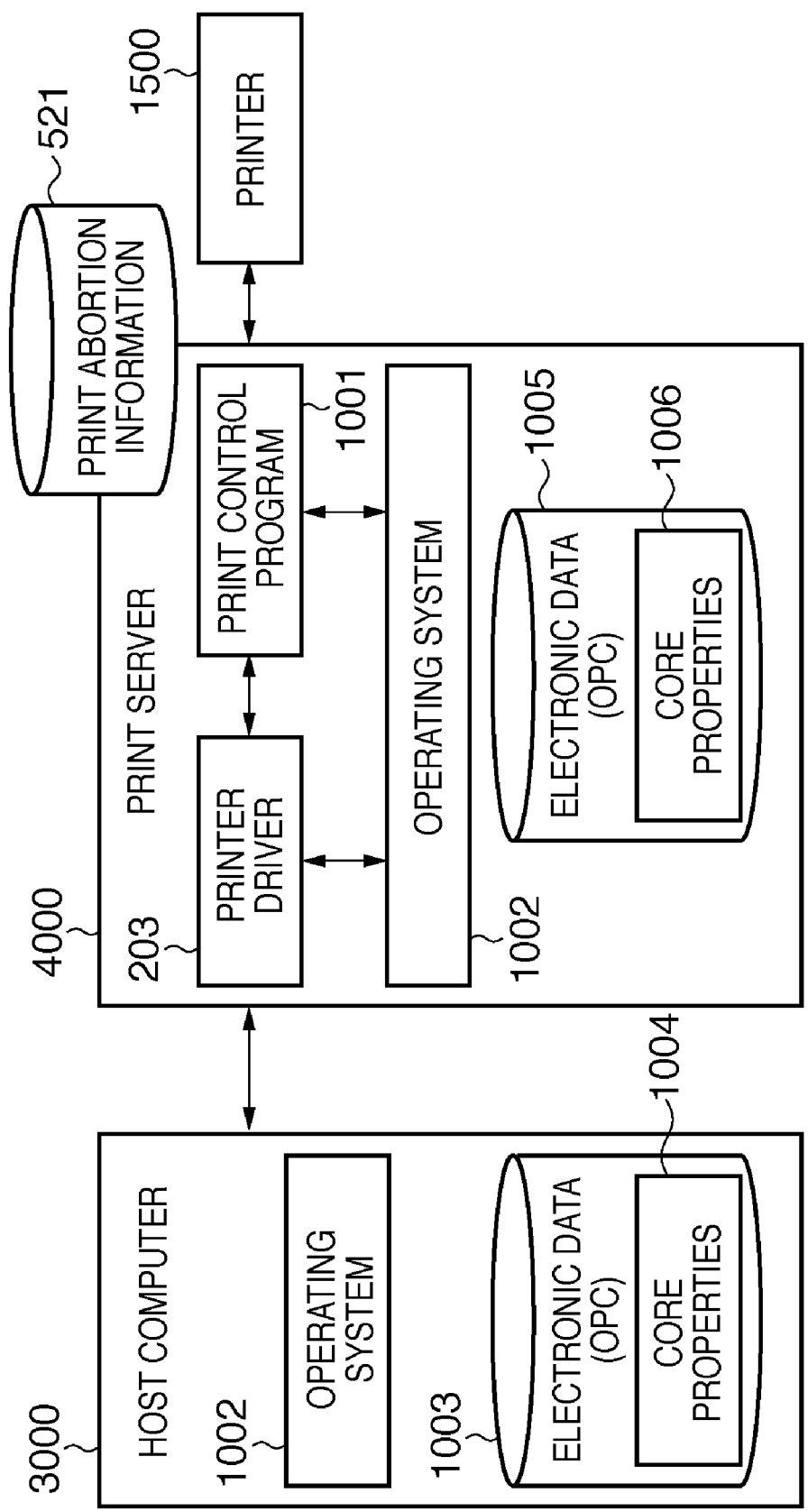
FIG. 10 is a block diagram showing the structure of a print system according to a second embodiment of the present invention.

FIG. 10 is a block diagram showing the structure of a print system according to a second embodiment of the present invention. As shown in FIG. 10, the present printing system is different from that of the first embodiment in that the print server 4000 is structured between the host computer 3000 and the printer 1500. Further, in FIG. 10, the structure of the software for the host computer 3000 and the print server 4000 is also shown. An operating system 1002 is read into the memories of the host computer 3000 and the print server 4000. The print control program 1001 is read into the memory of the print server 4000. Further, the printer driver 203 is read into the memory of the print server 4000 and manages network printers. The print abortion information 521 stores information regarding print abortion function in a format such as a registry or file data. Electronic data 1003 is electronic data adapted for OPC, and stores core properties 1004. Further, electronic data 1005 is electronic data adapted for OPC, which is created when the user creates the electronic data 1003 into a hot folder (also called as a monitoring folder). Core properties 1006 are core properties stored by the electronic data 1005.

Figure 11:
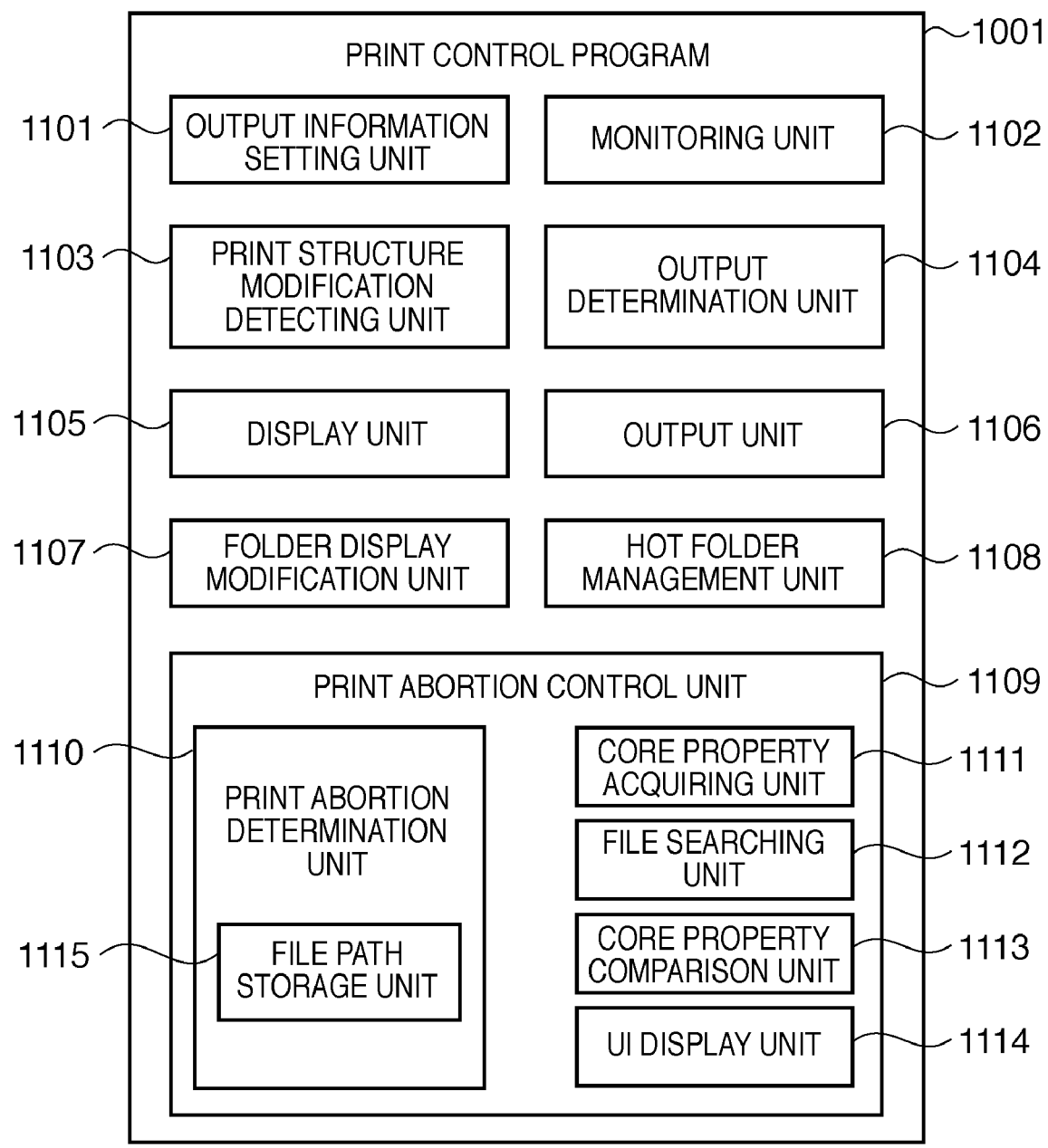
FIG. 11 is a diagram showing an exemplary module structure of a print control program.

FIG. 11 is a diagram showing an exemplary module structure of a print control program. An output information setting unit 1101 sets up hot folders by connecting the folders in the file system of the operating system with the information of the network printer executing the output and the print attribute information at the time of output. When setting up output information, it is also possible to display a window via the display unit of the operating system using a display unit 1105.

Figure 12:
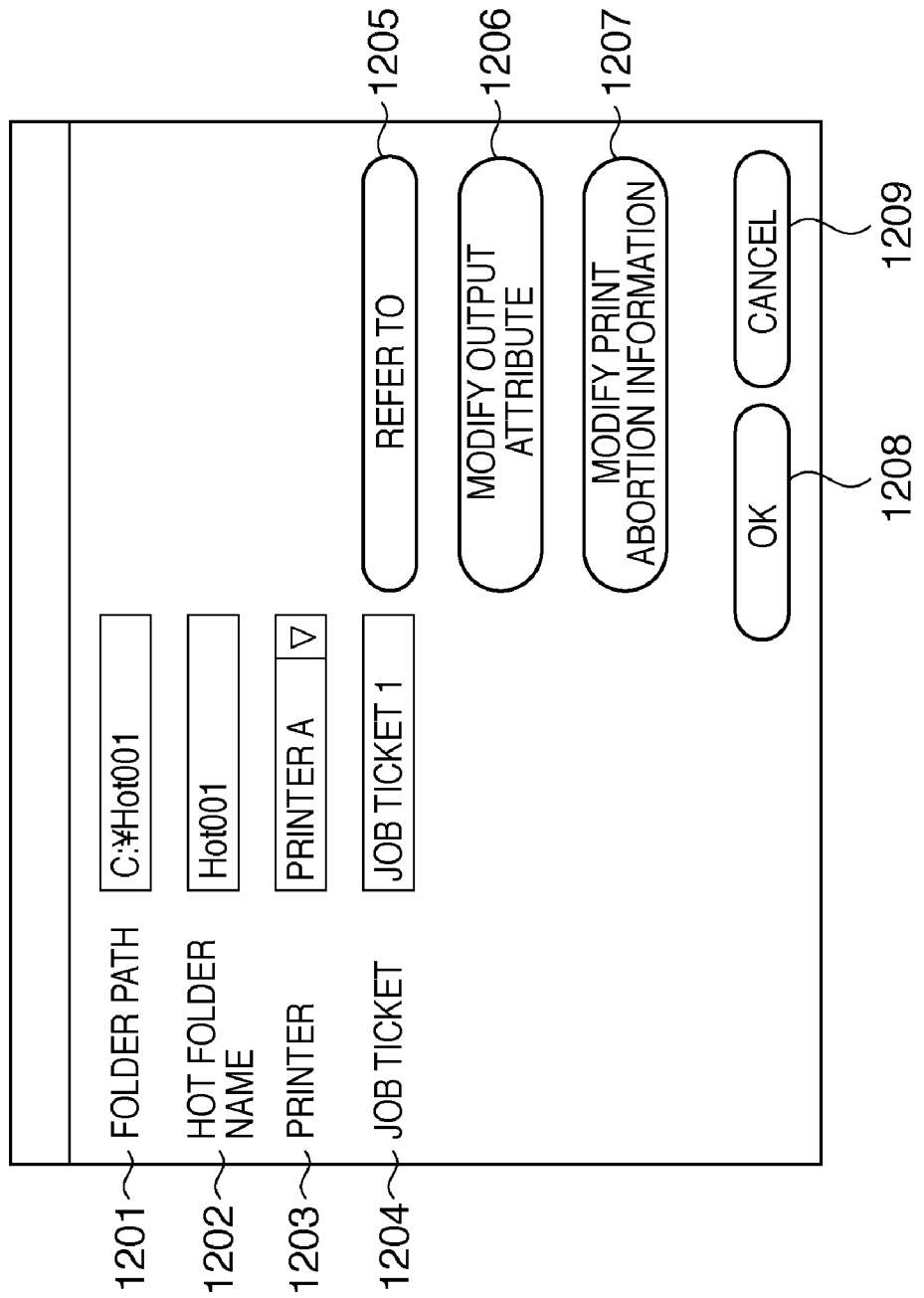
FIG. 12 is a diagram showing an exemplary window which sets a folder on the operating system as a hot folder.

FIG. 12 is a diagram showing an exemplary window which sets a folder on the operating system as a hot folder. As already explained, the user interface shown in FIG. 12 is displayed from the output information setting unit 1101 of the print control program 1001 of the print server 4000 via the display unit 1105. At an input area 1201, the user can set up a folder path which specifies a folder in the operating system. At an input area 1202, the user can set up a name of a hot folder used in the print control program. At an input area 1203, the user can select an output destination network printer. The network printer displayed at the input area 1203 can be a network printer registered in the operating system, and also can be a network printer registered by a different system. Further, it can also be arranged to allow addition of new network printers. At the input area 1204, the user can set up job ticket files in which print attribute information is set. When a button 1205 is pressed by the user, it is possible to specify a file of the file system in the operating system. When a button 1206 is pressed by the user, it is possible to display a window which is used for modifying output attributes set in the job ticket.

FIG. 13 is a diagram showing an exemplary window to modify output attributes, which is called by pressing the button 1206. At an input area 1301, the user can specify the number of copies of the electronic data 1005. At an input area 1302, the user can specify the page range of the electronic data 1005 to be printed. At an input area 1303, the user can specify the print paper size to be used in the printing of the electronic data 1005. At an input area 1304, the user can select a printing method, such as one-sided printing, double sided printing, saddle stitch printing, and case binding printing during the printing of the electronic data 1005. At an input area 1305, the user can set whether or not holes are to be punched on the printed sheets. By pressing a button 1306, setting of output attributes are fixed. Further, when the button 1306 is pressed, the content of the file set in the input area 1204 are updated. By pressing a button 1307, the setting of the output attribute is canceled.

Referring to FIG. 12 again, by pressing the button 1207, it is possible to display and modify settings of print restriction function.

Figure 14:
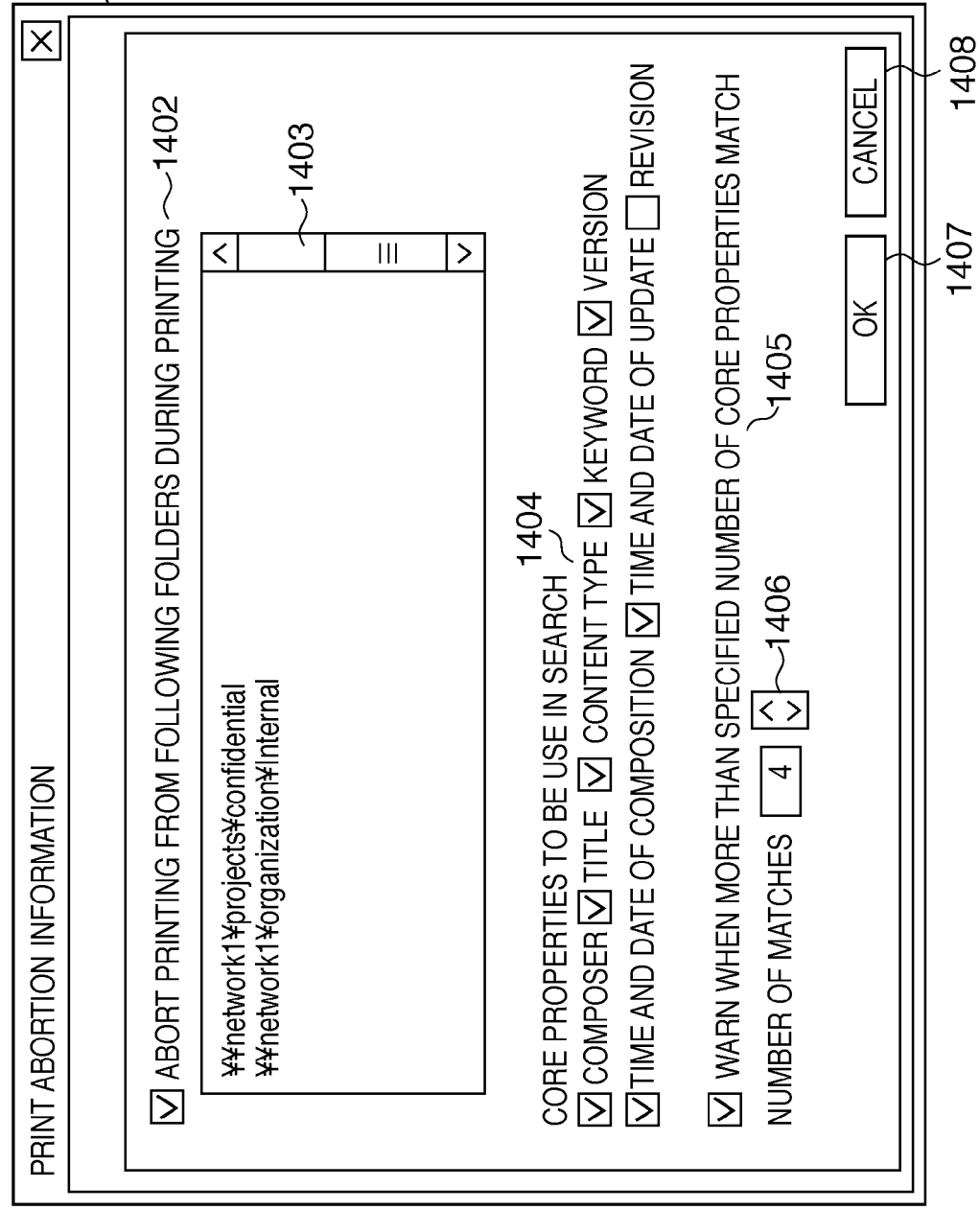
FIG. 14 is a diagram showing an exemplary window for modifying print abortion information.

FIG. 14 is a diagram showing an exemplary window for modifying print abortion information, which is called by pressing the button 1207. A window 1401 is an example of the user interface for modifying print abortion information, and the print abortion information 521 can be modified by, for example, a manager. An input area 1402 can specify whether printing is to be aborted or not from the specified folder at the time of print execution. A display unit 1403 displays the folder paths for which printing is to be aborted, and it is possible for the managers, etc., to modify the folder path for which printing is to be aborted. At an input area 1404, the manager, etc., can select properties to be used in comparison of core properties. An input area 1405 can specify whether or not to make a warning when more than the specified number of properties of the core properties match. An input area 1406 can specify conditions of the property match number when displaying a warning window. By pressing a button 1407, the current setting is applied and the window 1401 is closed. Further, by pressing a button 1408, the window 1401 is closed without applying the current setting.

FIG. 11 will be referred again. A monitoring unit 1102 monitors the folder which is set as a hot folder at the output information setting unit 1101, and detects the electronic data 1003 stored in the folder. The monitoring of folder can be arranged to periodically check the file list within the folder thereby detecting newly stored files, or can also be arranged to take place whenever an event is detected which is generated when a file is stored. The print structure modification detecting unit 1103 detects modification in structure when optional apparatuses of the network printers are connected or disconnected. It can also be arranged to detect modifications in structure by acquiring structural information at fixed intervals from the network printers. Further, it can be arranged to detect structural modifications by receiving structural modification notices from network printers, or by detecting event notices when the printer driver acquires structure information of network printers. The output determination unit 1104 determines whether or not to process output attributes of a job ticket at the network printer set in the hot folder. At this step, determination can be achieved by comparing the structure information of the network printers and the output attributes of the job ticket, by determining whether to print or not by setting the output attribute of the job ticket in the printer driver, or by using other determination methods. The display unit 1105 displays the print control program 1001. An output unit 1106 transmits a print job to a network printer via an interface, and executes printing. A folder display modification unit 1107 modifies the display format within the file system of the operating system 1002. A hot folder management unit 1108 manages information regarding hot folders set by the output information setting unit 1101 using a hot folder management table which will be discussed later.

FIG. 15 is a diagram showing an exemplary hot folder management table according to the present embodiment. A display area 1501 keeps the name of the hot folder set at the output information setting unit 1101. A display area 1502 keeps the name of the output destination printer which is associated with the hot folder at the output information setting unit 1101. A display area 1503 keeps the status of the hot folder. In FIG. 15, a "normal" status indicates a status of the hot folder without any abnormalities. Further, an "unable to print" status indicates a status of the hot folder in which all settings of the job ticket set in the hot folder cannot be processed at the network printer set in the hot folder. Further, an "access denied" status indicates a status of the hot folder in which the access authorization of the user logged in to the operating system is insufficient for accessing the folder set in the hot folder. Further, a "printer unknown" status indicates a status of the hot folder in which information such as structure information could not be acquired regarding the printer set at the printer structure modification detecting unit 1103. Further, a "job ticket unknown" status indicates a status of the hot folder in which files in the job ticket set at the output determination unit 1104 cannot be located, damaged, or there is defect in the content of the job ticket. Further, a "printing" status indicates a status in which the electronic data 1003 and the job ticket put into the hot folder are forwarded as print jobs to the network printer set in the hot folder. Or, it indicates a status of the hot folder in which print job is being processed in a network printer. Further, a "folder unknown" status indicates a status of the hot folder in which the folder in the file system of the operating system set in the hot folder cannot be found due to, for example, deletion. A display area 1504 keeps the folder path in the file system of the operating system specified by the hot folder at the output information setting unit 1101. A display area 1505 keeps the name of the job ticket associated to the hot folder at the output determination unit 1104. For this, the hot folder management table can be kept in the memory of the client, in a file, in a database, or by using any other methods.

A print abortion control unit 1109 shown in FIG. 11 controls print execution or abortion during printing in which storage of the electronic data 1003 is detected in the hot folder. A print abortion determination unit 1110 determines whether printing is to be executed or aborted. A core property acquiring unit 1111 acquires the core properties 1006 within the electronic data 1005. A file searching unit 1112 acquires the file group of the print aborted folder specified by the print abortion folder path information (area 902) of the print abortion information 521. A core property comparison unit 1113 compares the core properties of the acquired file group and the core properties 1006. A UI display unit 1114 displays either the window 801 or 803, depending on the comparison result from the core property comparison unit 1113. A file path storage unit 1115 stores the file path information which matched at the core property comparing unit 1113.

Figure 16:
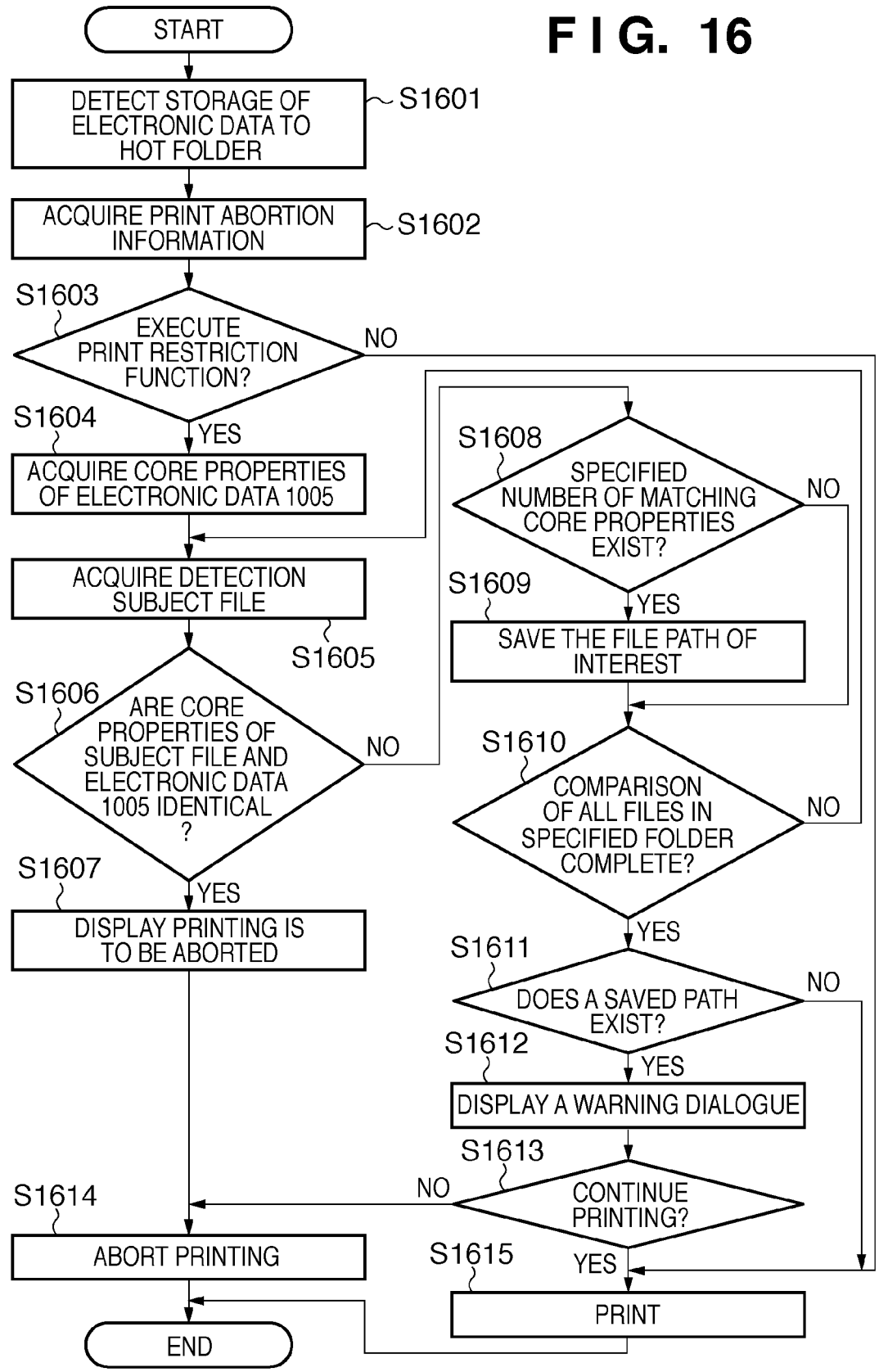
FIG. 16 is a flow chart showing the order of print restriction process according to the present embodiment.

FIG. 16 is a flow chart showing the order of print restriction process according to the present embodiment. First, at step S1601, the monitoring unit 1102 of the print control program 1001 detects that the electronic data 1003 is stored in the hot folder.

At step S1602, the print abortion control unit 1109 acquires the print abortion information 521.

At step S1603, the print abortion control unit 1109 acquires whether or not print restriction function is to be executed (area 901), and determines whether print restriction function is to be executed. At this step, when it is determined the print restriction function is not to be executed, the process moves on to step S1615. At step S1615, the output unit 1106 transmits the electronic data 1005 and the print job according to the output attribute of the hot folder. On the other hand, when it is determined the print restriction function is to be executed, the process moves on to S1604.

At step S1604, the core property acquiring unit 1111 acquires the core properties 1006 from the electronic data 1005.

At step S1605, the file searching unit 1112 obtains the core properties of the file group within the print aborted folder specified in the print aborted folder path information (area 902), from the print abortion information 521 acquired at step S1602. At this step, in cases such as when the folder of interest could not be reached during the present process, it can also be arranged to abort print processing immediately.

At step S1606, the core property comparing unit 1113 compares the core properties of files acquired at step S1605 and the core properties 1006 acquired at step S1604. Core properties to be used in the comparison are acquired from the core property comparison subject information (area 903). At this step, as a result of comparison, when all properties match, the process moves on to step S1607. On the other hand, when not all properties match, the process moves on to step S1608.

At step S1607, the UI display unit 1114 displays a user interface such as the window 801 shown in FIG. 8A. At this step, the process continues when the user presses the button 802.

At step S1614, the print control program 1001 aborts printing and terminates the present process.

At step S1608, the print abortion condition information (area 904) is acquired, and existence of more than a specified number of matching core properties is determined. At this step, when the number of matching properties exceed the specified number, the process moves on to step S1609, and the file path storage unit 1115 stores the file path of interest. Further, as the processing for cases in which more than the specified number of matching properties exist, it is also possible to move on to step S1614, and immediately abort printing. On the other hand, when there are less matching properties than the specified number, the process moves on to step S1610.

At step S1610, the print abortion control unit 1109 determines whether comparison of the core properties of all files within the print aborted folder and the core properties 1006 has been completed. At this step, if the comparison is determined be completed, the process moves on to step S1611. On the other hand, if the comparison is determined not to be complete, the process returns to step S1605.

At step S1611, it is determined whether a file path stored in the file path storage unit 1115 exists or not. When it is determined at this step that such file paths exist, the process moves onto step S1612. On the other hand, when it is determined that they do not exist, the process moves to step S1615.

At step S1612, the UI display unit 1114 displays a user interface such as the window 803 shown in FIG. 8B.

At step S1613, when a button 804 is pressed, the print abortion determination unit 1110 determines that the printing is to be continued and moves onto step S1615, and when a button 805 is pressed, the process moves on to S1614.

At step S1615, the output unit 1106 transmits to the printer the electronic data 1005 and the print job according to the output attributes of the hot folder.

As discussed above, in the present invention, during print execution, it is possible to search whether original files of the data for printing exist in the print aborted folder. In other words, the subject being searched is not data for printing, but is the original file. Accordingly, for example, even when the text portion of the original file is converted to an image and therefore has become data for printing, the search is performed on the original file. Therefore, it is possible to improve the accuracy of searching a document for which printing is to be aborted.

Further, in the present embodiment, it can also be arranged such that instead of aborting printing of the specified folder, printing can be done in black and white or N-up printed. Further, in the present embodiment, since the printer driver can refer to the core properties of the original file, it is also possible to, for example, update the latest print date/time and incorporate this information in the original file.

The present invention also includes cases in which the operating system (OS) performs a part or the entirety of the actual processing based on commands of program codes functioning as a print control program, and realize the function of the above-mentioned embodiment from this process. Further, the present invention can also be applied to cases in which the program code read from a storage medium is written into the function expansion card inserted into the computer, or a memory of the function expansion unit connected to the computer. In such cases, a part of the entirety of the actual processing is performed by, for example, a CPU provided in the function expansion card or unit based on the commands from the written-in program code, and the function of the above-mentioned embodiment is realized by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-285404, filed on Nov. 1, 2007, which is hereby incorporated by reference herein in its entirety.

What is claimed is:

1. A print control apparatus comprising:
   a first acquiring unit configured to acquire a first property of print data corresponding to a file to be instructed to print;
   a second acquiring unit configured to acquire a second property of the file stored in a folder, the file being stored in the folder for prohibiting printing;
   a determination unit configured to determine whether or not the first property and the second property are matched with each other; and
   a print control unit configured to control a print process based on the print data to abort when it is determined by said determination unit that the first property and the second property are matched with each other, and to control the print process to continue, after the file is instructed to print, when it is determined by said determination unit that the first property and the second property are not matched with each other.

2. An apparatus according to claim 1, wherein the print data is generated when the file is instructed to print and a content of the second property is inherited to the first property of the print data.

3. An apparatus according to claim 2, wherein each of the first and second properties is a core property defined in XML Paper Specification.

4. An apparatus according to claim 1, further comprising:
   a folder setting unit configured to set the folder.

5. An apparatus according to claim 1, wherein each of the first and second properties has a plurality of items, the plurality of items including at least one of a preparer of the file, a title of the file, a content type of the file, a key word, a version of the file, a file-preparing date, an file-updating date, and a revision of the file.

6. An apparatus according to claim 5, further comprising:
   a property specifying unit configured to specify at least one item among the plurality of items,
   wherein the determination unit determines, regarding the specified at least one item, whether or not the first property and the second property are matched with each other.

7. A print control method, for printing with a print control apparatus including a processor, the method comprising: a first acquiring step of acquiring a first property of print data corresponding to a file to be instructed to print; a second acquiring step of acquiring a second property of the file stored in a folder, the file being stored in the folder for prohibiting printing; a determination step of determining whether or not the first property and the second property are matched with each other; and a print control step of controlling a print process based on the print data to abort when it is determined by said determination step that the first property and the second property are matched with each other, and to control the print step to continue, after the file is instructed to print, when it is determined by said determination step that the first property and the second property are not matched with each other, wherein the first acquiring step, the second acquiring step, the determination step and the print control step are performed, at least in part, by the processor.

8. A non-transitory computer-readable medium storing a program that, when executed by a computer, causes the computer to perform a method, the method comprising the steps of:
   a first acquiring step of acquiring a first property of print data corresponding to a file to be instructed to print;
   a second acquiring step of acquiring a second property of the file stored in a folder, the file being stored in the folder for prohibiting printing;
   a determination step of determining whether or not the first property and the second property are matched with each other; and
   a print control step of controlling a print process based on the print data to abort when it is determined by said determination step that the first property and the second property are matched with each other, and to control the print step to continue, after the file is instructed to print, when it is determined by said determination step that the first property and the second property are not matched with each other.

* * * * *